(12) United States Patent
Doman et al.

(10) Patent No.: US 10,161,491 B1
(45) Date of Patent: Dec. 25, 2018

(54) FAIL-SAFE SELECTIVE SELF-LOCKING ACTUATOR

(71) Applicant: The United States of America as represented by the Secretary of the Air Force, Washington, DC (US)

(72) Inventors: David B Doman, Springfield, OH (US); Michael W Oppenheimer, Beavercreek, OH (US)

(73) Assignee: The United States of America as Represented by the Secretary of the Air Force, Washington, DC (US)

( * ) Notice: Subject to any disclaimer, the term of this patent is extended or adjusted under 35 U.S.C. 154(b) by 383 days.

(21) Appl. No.: 14/748,315

(22) Filed: Jun. 24, 2015

(51) Int. Cl.
*F16H 25/20* (2006.01)
*F16H 25/24* (2006.01)

(52) U.S. Cl.
CPC ..... *F16H 25/2454* (2013.01); *F16H 25/2025* (2013.01)

(58) Field of Classification Search
CPC .................. F16H 25/2025; F16H 25/2454
See application file for complete search history.

(56) References Cited

U.S. PATENT DOCUMENTS

| | | | | |
|---|---|---|---|---|
| 2,915,913 A | * | 12/1959 | Molyneux | F16H 25/20 254/100 |
| 3,777,516 A | * | 12/1973 | Tigges | D06B 5/16 242/130.2 |
| 5,337,627 A | | 8/1994 | Nakamura | |
| 6,672,540 B1 | * | 1/2004 | Shaheen | B64C 13/28 244/87 |
| 8,291,782 B1 | * | 10/2012 | Shaheen | B64C 13/28 74/89.23 |
| 2009/0183585 A1 | * | 7/2009 | Huang | B25B 1/103 74/89.24 |
| 2016/0230862 A1 | * | 8/2016 | Hoover | F16H 25/2025 |

* cited by examiner

*Primary Examiner* — Terence Boes
(74) *Attorney, Agent, or Firm* — AFMCLO/JAZ; Matthew Fair

(57) ABSTRACT

A selectively self-locking actuator includes a threaded shaft having a first threaded portion and a second threaded portion. The first threaded portion includes a semicircular ball screw threadform and the second threaded portion includes a power screw threadform. The actuator further includes a ball nut mated to the first threaded portion, a split nut selectively mated with the second threaded portion, and a nut coupler plate configured to secure the ball nut and split nut at a fixed distance from each other. The split nut includes at least a first split nut portion and a second split nut portion each mated to a spring and a driver. The spring is configured to bias the first split nut portion and the second split nut portion either radially inward or radially outward with respect to the threaded shaft, and wherein the driver is configured to selectively oppose the bias of the spring.

9 Claims, 2 Drawing Sheets

FAIL-SAFE SELECTIVE SELF-LOCKING ACTUATOR

RIGHTS OF THE GOVERNMENT

The invention described herein may be manufactured and used by or for the Government of the United States for all governmental purposes without the payment of any royalty.

FIELD OF THE INVENTION

The present invention relates generally to electromechanical positioning apparatus and, more particularly, to selectively lockable linear and rotary actuators.

BACKGROUND OF THE INVENTION

The management of heat and energy on current military aircraft has become increasingly challenging due to the array of sensors, electronics, and weapons systems onboard. The ability of an aircraft to accomplish a thermally stressful mission can be limited by the requirement to remove heat from aircraft subsystems. Logistically complex pre-flight measures may need to be employed to enable aircraft to complete thermally stressful missions. Thus, high efficiency subsystems, as well as power and thermal management systems, are needed to mitigate such problems.

Flight control actuation systems are now contributing more to the heat load on aircraft since systems have moved from centralized hydraulic systems, to decentralized electro-hydrostatic actuator (EHA) systems. Future aircraft are expected to make additional use of electromechanical actuators (EMAs), which will further increase thermal loads on the aircraft energy management system. The use of composite skins on new aircraft has made it more difficult to dissipate waste thermal energy to the atmosphere. The problem is particularly relevant to passively cooled electrical components, such as electromechanical flight control actuators, that are isolated inside of internal bays inside of composite wings and the aircraft empennage.

A typical EMA may include an electric motor, gearbox, screw, nut, and linkage. EMAs employing a nut with a recycling raceway of ball bearings may be referred to collectively as a ball screw. In these configurations, either the nut or the screw can serve as a ram, depending upon which element is held fixed relative to the aircraft fuselage. The ram may be connected to a linkage that forces the aerodynamic surface to pivot. The motor current required to produce the surface motion commanded by the flight control system is proportional to the torque that is required to overcome the inertia and aerodynamic loads applied to the system. The rate at which waste heat is generated resulting from inefficiencies inherent in the actuator is proportional to the square of the applied current and the effective friction coefficient of the moving components. Since motor torque is proportional to current, minimizing waste heat is equivalent to minimizing motor torque.

Mechanisms may be employed to reduce or eliminate the torque necessary to maintain the EMA's position while under load. For example, a self-locking screw may be used in an EMA. In such self-locking configurations, the drive motor is not required to generate any torque to hold a load in a fixed position. As a result, holding the position does not require current or power, thereby eliminating waste heat. However, when a self-locking screw and nut are in motion, or when overcoming potentially significant stiction forces to initiate movement, the high friction coefficient results in elevated levels of heating as a result of the motor current required to overcome friction. Waste heat resulting from those additional frictional losses is transferred to the fuselage. Conversely, if a screw is not self-locking, motor current is required to hold a fixed position when an external load is applied. Most EMAs designed for use on aerospace vehicles use non-self-locking ball screws in order to satisfy safety of flight requirements (dictating that surfaces must fail in a floating rather than a locked position). These non-self-locking ball screws also require much less power to operate when they are in motion when compared to self-locking screws, as their equivalent friction coefficients are an order of magnitude lower than the friction coefficient of the best self-locking power screws. Unfortunately, since they are so efficient at turning rotational energy into linear motion, linear loads are conversely transformed into a rotational load that must be resisted by the motor.

As a result of the above noted deficiencies, there is a need in the art for a selectively self-locking EMA that requires reduced or zero motor current to hold static loads, while taking advantage of the low friction benefits of a ball screw when the actuator is in motion.

SUMMARY OF THE INVENTION

The present invention overcomes the foregoing problems and other shortcomings, drawbacks, and challenges of locking an EMA without producing extraneous waste heat. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a selectively self-locking actuator is provided. The actuator includes a threaded shaft having a first threaded portion and a second threaded portion. The first threaded portion includes a semicircular ball screw threadform and the second threaded portion includes a power screw threadform. The actuator further includes a ball nut mated to the first threaded portion, a split nut selectively mated with the second threaded portion, and a nut coupler plate configured to secure the ball nut and split nut at a fixed distance from each other. The split nut includes at least a first split nut portion and a second split portion each mated to a spring and a driver. The spring is configured to bias the first split nut portion and the second split nut portion either radially inward or radially outward with respect to the threaded shaft, and wherein the driver is configured to selectively oppose the bias of the spring.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figures 1A, 1B:
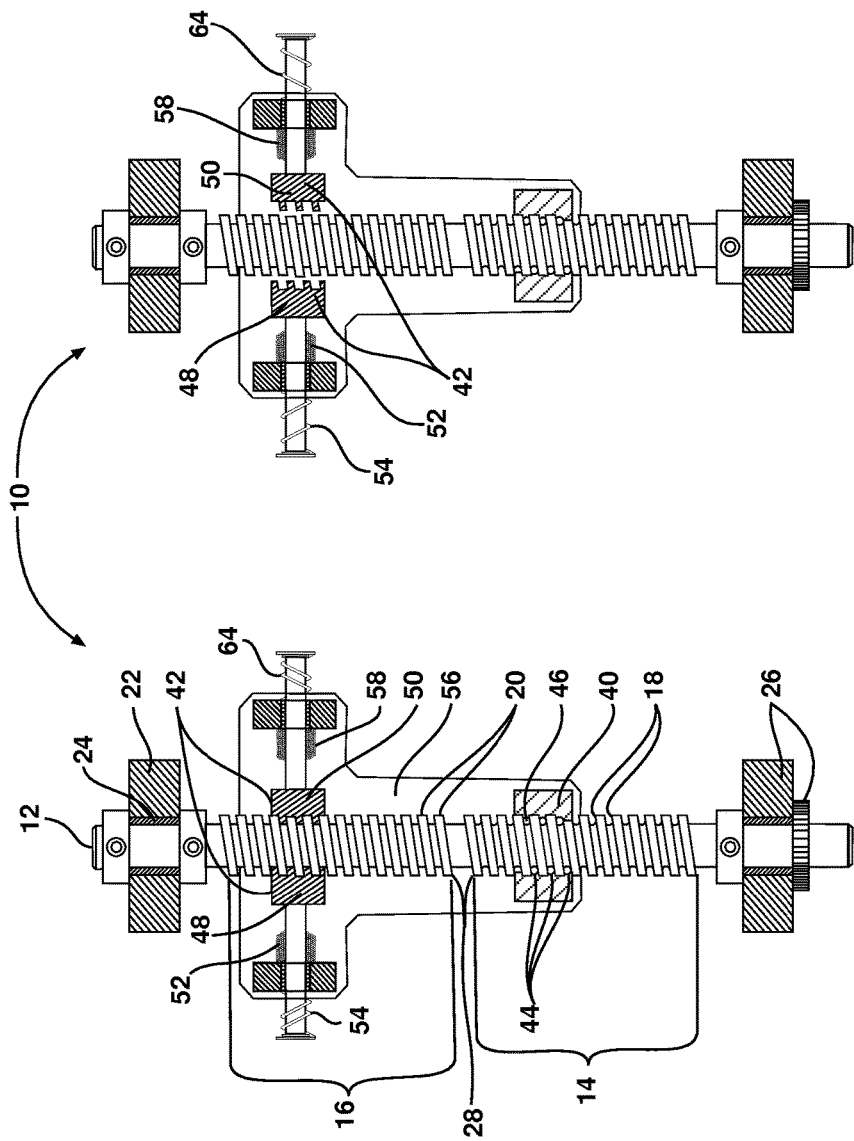
FIG. 1A illustrates an embodiment of the disclosed invention wherein a split nut is in an engaged configuration.
FIG. 1B illustrates an embodiment of the disclosed invention wherein a split nut is in a disengaged configuration.

Turning attention to FIG. 1A, an embodiment of a selectively locking fail-safe actuator 10 is shown. The actuator 10 includes a threaded shaft 12 that includes a first threaded portion 14 and a second threaded portion 16. The first threaded portion 14 may comprise a helical ball raceway 18 having a semicircular threadform configured to receive, and cooperate with, a plurality of ball bearings therein. The second threaded portion 16 may include a power screw helix 20 including an acme threadform, trapezoidal threadform, square threadform, buttress threadform, or other suitable power screw threadform known to one of ordinary skill in the art. The threaded shaft 12 may be retained by one or more pillow blocks 22 including one or more shaft bearings 24. In such configurations, the threaded shaft 12 is free to rotate about its longitudinal axis, but is prevented from any significant axial translation. The threaded shaft 12 may be driven by a motor or other power supply terminating at a final stage gear 26 (or, if driven by a discrete transmission or gearbox, the output of the transmission or gearbox may mate with the threaded shaft 12 directly). The first threaded portion 14 and second threaded portion 16 may be isolated by a separation distance 28 having an unthreaded portion. It should be noted that the first threaded portion 14 and the second threaded portion 16 need not have the same pitch, but should have the same lead. In other words, a given rotation of the threaded shaft 12 should advance the first threaded portion 14 an equal distance as the given rotation would advance the second threaded portion 16.

The first threaded portion 14 and second threaded portion 16 may be mated to a ball nut 40 and split nut 42, respectively. The ball nut 40 may include a plurality of raceways 44 housing a plurality of ball bearings 46 that operate within a recirculating pathway (internal or external, not shown). The combination of the cooperating first portion 14 and ball nut 40 efficiently translates a rotational force applied to the final stage gear 26 into a linear displacement of the ball nut 40. The split nut 42 may include a first split nut portion 48 and a second split nut portion 50. In some embodiments, the split nut 42 may be divided into three or greater portions. Each of the segments of the split nut 42 may be selectively reciprocated radially inward or radially outward with respect to the threaded shaft 12 by use of solenoids 52 and 58 or other split nut driver known to one of ordinary skill in the art. By way of example, the portions of the split nut 42 may be driven by a pneumatic cylinder, hydraulic cylinder, mechanical linkage, or the like. The ball nut 40 and split nut 42 may be held in a fixed relationship with respect to each other by use of a nut coupler plate 56, or other fixture configured to fixedly interconnect the ball nut 40 and split nut 42. A linear bearing or other track (not shown) may couple the split nut 42 at a fixed distance from the ball nut 40, while still enabling the portions of the split nut 42 to slide axially inward or outward with respect to the threaded shaft 12.

In use, the nut coupler plate 56 may be mated to a load (not shown). In an unlocked configuration, the first and second split nut portions 48 and 50 are disposed radially outward from the second threaded portion 16. The final stage gear 26 is rotated to turn the cooperating threaded shaft 12, first threaded portion 14. The ball nut 40 and nut coupler plate 56 translates along the linear axis of the threaded shaft 12. When motion of the final stage gear 26 stops, linear forces from the load will act upon the actuator 10, and will attempt to backdrive the final stage gear 26. To resist this motion, a counteracting torque would conventionally be applied via a motor to the final stage gear 26. An electric motor providing that counteracting torque would need to expend energy for the entire duration that a force was imparted by the load. To hold the load using embodiments of the disclosed invention, however, the portions of the split nut 42 are driven radially inwardly toward the threaded shaft 12. The threads of the split nut 42 mate with the second threaded portion 16 and frictional forces between the shoulders of the threads will hold a rated force of the load without application of any counteracting torque being applied to the final stage gear 26. Essentially, the load is transferred from the ball screw threads to the power screw threads in the same way that a vise or woodworking clamp would hold an object under a compressed load between its jaws. In order for the load to transfer, the backlash of the ball screw must be greater than the backlash of the split nut when the split nut is engaged. Conversely, driving the portions of the split nut 42 outwardly allows the force of the load to be transformed into a corresponding torque experienced by the final stage gear 26. This unlocked configuration is depicted in FIG. 1B. As a result of the operation of the split nut 42, it can be described as being selectively mated to the second threaded portion 16.

Springs 54 and 64 or other resilient structure may bias the portions of the split nut 42 radially outward with respect to the threaded shaft 12. It is noted that a spring may be coupled to each of the portions, or a communal spring may be applied to each of the portions via linkage or other mechanical communication. In this configuration, the actuator 10 may be deemed to be fail-safe. In this fail-safe configuration, upon loss of power and corresponding loss of actuation from the solenoids 52 and 58, the portions of the split nut 42 are decoupled from the second threaded portion 16 and all linear forces applied to the nut coupler plate 56 are imparted to rotation of the final stage gear 26. When used in aircraft-related applications, wherein a flight control surface is coupled to the nut coupler plate 56, the flight control surface will "float" and will not be locked in a fixed position upon a loss of actuator power. This is desirable, as surviving control surfaces may be unable to maintain controlled flight if control surfaces of the failed system become locked during a maneuver. Conversely, the portions of the split nut 42 may be biased radially inwardly such that loss of power locks the nut coupler plate under the force of the load. This configuration may be referred to as fail-secure, and may be used to lock critical hoisted loads, secure landing gear or a load balancing counterweight in a fixed position, or to accomplish other design objectives.

Figure 2:
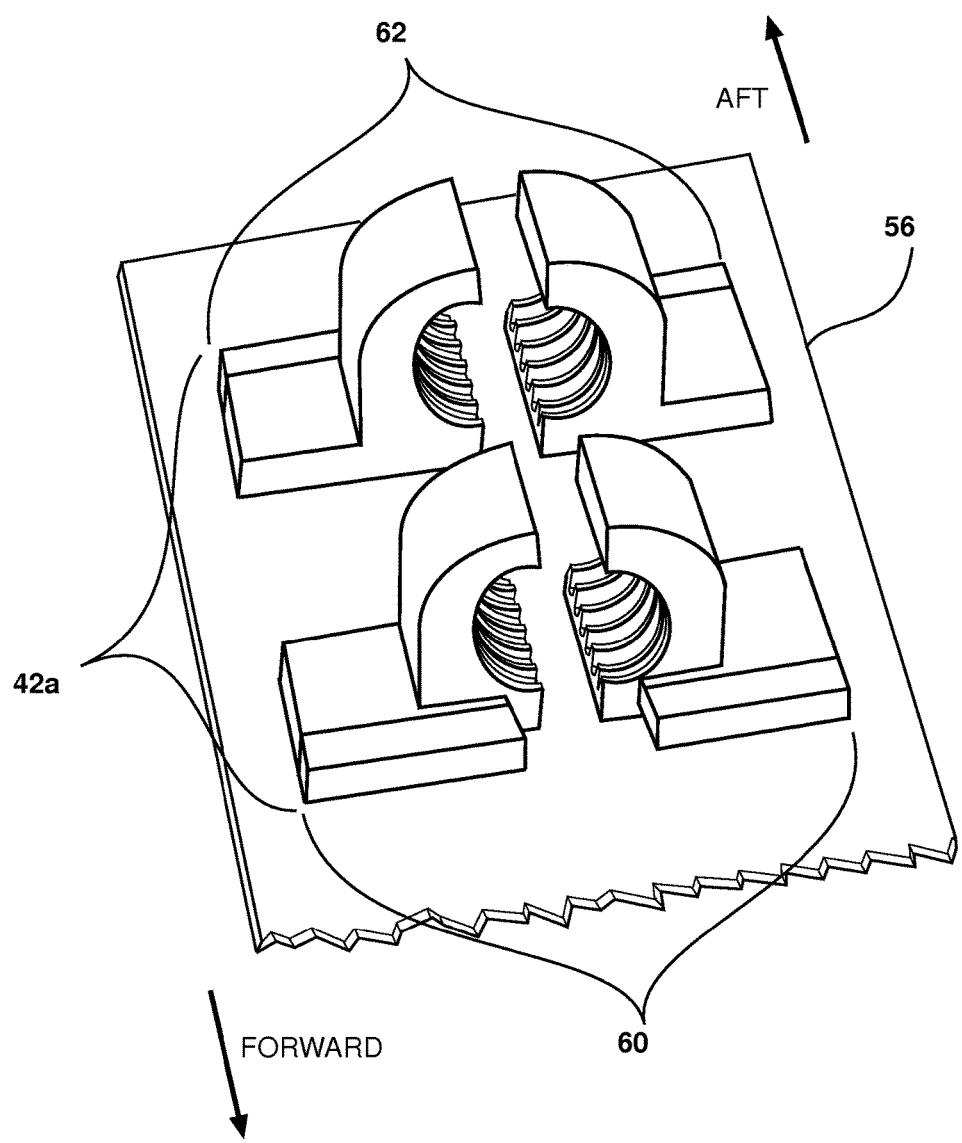
FIG. 2 is a perspective view of an alternative configuration of a split nut in accordance with an embodiment of the disclosed invention.

Turning attention to FIG. 2, some embodiments of the disclosed invention may be configured to selectively minimize play (backlash) in the system for both positive and negative loads mated to the actuator 10. For example, a control surface mated to the nut coupler plate 56 may be described as applying a positive load when the force drives the nut coupler plate 56 forward, and described as a negative load when the force drives the nut coupler plate 56 aft. To reduce the distance that the coupler plate 56 travels between the event of applying a load, and causing the coupler plate 56 to be halted by the actuated split nut 42a, the split nut 42a may be segmented into a forward preload set 60, and an aft preload set 62. Threads of the forward preload set 60 are disposed forward of the location that threads of the previously disclosed split nut 42 (FIGS. 1A and 1B) would be positioned with respect to the coupler plate 56. In this way, the shoulders of the threads on the forward preload set 60 are already nearly in contact with the shoulders of threads on the second threaded portion 16 (FIGS. 1A and 1B). As a result, much of the play in the direction of the load can be eliminated. To reduce wear and limit binding, each of preload sets 60 and 62 may be selectively engaged or disengaged to provide backlash limitation in the direction (positive or negative) of the load applied to the nut coupler plate 56. Such selective actuation may be determined by a processor in communication with a strain gauge (not shown), or deduced from other data in the control system (moving a flight stick up may always result in a positive force being applied to a given actuator 10). As is the case with the previously disclosed split nut 42, the forward preload set 60 and aft preload set 62 may be spring biased in either of the engaged or disengaged positions as required by design objectives.

In order to facilitate reliable operation of the fail safe embodiments, the angle of power screw threads of the second threaded portion 16 may be modified from those commonly found in commercially available acme or similar threadforms. For example, if a shallow angle is selected (approaching a square threadform) the split nut 42 may bind against the second threaded portion 16 while under load. As a result, when power is lost to the solenoids 52 and 58 the biasing force of the springs 54 and 64 may be insufficient to drive the first split nut portion 48 and second split nut portion 50 into a disengaged configuration (thus preventing proper fail safe operation). Conversely, if a thread angle can be selected such that the first split nut portion 48 and second split nut portion 50 will be forcibly driven apart when the actuator 10 is under load, then more powerful, and more energy consumptive, solenoids 52 and 58 will be required to maintain locking action in response to a given load. As a result, design consideration should contemplate a thread angle that is sufficiently shallow to allow consistent decoupling upon loss of power, while enabling locking action under the highest anticipated application of load.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A selectively self-locking actuator, the actuator comprising:
   a threaded shaft having a first threaded portion and a second threaded portion;
   an unthreaded portion positioned between the first threaded portion and the second threaded portion, wherein the first threaded portion includes a semicircular ball screw threadform and the second threaded portion includes a power screw threadform;
   a ball nut mated to the first threaded portion;
   a split nut selectively mated with the second threaded portion;
   a nut coupler plate configured to secure the ball nut and split nut at a fixed distance from each other;
   wherein the split nut includes at least a first split nut portion and a second split portion each mated to a spring and a driver; and
   wherein the spring is configured to bias the first split nut portion and the second split nut portion either radially inward or radially outward with respect to the threaded shaft, and wherein the driver is configured to selectively oppose the bias of the spring.

2. The actuator of claim 1, wherein the first split nut portion and the second split nut portion are further segmented into a forward preload set and an aft preload set.

3. The actuator of claim 1, wherein each of the first split nut portion and the second split nut portion is coupled to a linear bearing extending generally radially outward with respect to the threaded shaft.

4. The actuator of claim 1, wherein the spring of the first split nut portion and the spring of the second split nut portion is configured to retract the first split nut portion and the second split nut portion radially outward with respect to the threaded shaft when the driver is deactivated.

5. The actuator of claim 1, wherein the spring of the first split nut portion and the spring of the second split nut portion is configured to engage the first split nut portion and the second split nut portion radially inward with respect to the threaded shaft when the driver is deactivated.

6. The actuator of claim 1, wherein each of the first split nut portion and the second split nut portion is slidably mated to the nut coupler plate with a linear bearing.

7. The actuator of claim 1, wherein a shape or an angle of the power screw threadform is configured to cause the spring to disengage the first split nut portion or the second split nut portion from the second threaded portion while the actuator is under load and while the driver is not opposing the spring.

8. A selectively self-locking actuator, the actuator comprising:
   a threaded shaft having a first threaded portion and a second threaded portion, wherein the first threaded portion includes a semicircular ball screw threadform and the second threaded portion includes a power screw threadform;
   a ball nut mated to the first threaded portion;
   a split nut selectively mated with the second threaded portion, wherein the split nut comprises an unthreaded outer surface;
   a nut coupler plate that secures the ball nut and split nut at a fixed distance from each other;

wherein the split nut includes at least a first split nut portion and a second split portion each mated to a spring and a driver; and wherein the spring biases the first split nut portion and the second split nut portion either radially inward or radially outward with respect to the threaded shaft, and wherein the driver is configured to selectively oppose the bias of the spring.

9. A selectively self-locking actuator, the actuator comprising:

a threaded shaft having a first threaded portion and a second threaded portion, wherein the first threaded portion includes a semicircular ball screw threadform and the second threaded portion includes a power screw threadform;

a ball nut mated to the first threaded portion;

a split nut selectively mated with the second threaded portion;

a nut coupler plate interconnecting the ball nut with the split nut, wherein the nut coupler plate comprises a planar surface along which the split nut slides inwardly and outwardly with respect to the threaded shaft, and wherein the nut coupler is configured to secure the ball nut and split nut at a fixed distance from each other;

wherein the split nut includes at least a first split nut portion and a second split portion each mated to a spring and a driver; and wherein the spring is configured to bias the first split nut portion and the second split nut portion either radially inward or radially outward with respect to the threaded shaft, and wherein the driver is configured to selectively oppose the bias of the spring.

* * * * *